(12) United States Patent
Nassimi

(10) Patent No.: US 8,325,040 B2
(45) Date of Patent: Dec. 4, 2012

(54) METHOD AND APPARATUS TO FACILITATE AUTOMATED CONTROL OF LOCAL LIGHTING AT A REMOTE CONTROL

(75) Inventor: Shary Nassimi, Malibu, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1012 days.

(21) Appl. No.: 12/119,918

(22) Filed: May 13, 2008

(65) Prior Publication Data

US 2009/0284386 A1    Nov. 19, 2009

(51) Int. Cl.
*G08B 13/18* (2006.01)
*G05B 13/02* (2006.01)
(52) U.S. Cl. .......................................... 340/567; 700/28
(58) Field of Classification Search ............... 340/686.6, 340/540, 541, 567; 315/294; 700/28; 362/227
See application file for complete search history.

(56) References Cited

U.S. PATENT DOCUMENTS

| | | | |
|---|---|---|---|
| 3,704,413 A | 11/1972 | Blevins | |
| 3,896,425 A | 7/1975 | Erichsen | |
| 4,696,785 A | 9/1987 | Cook et al. | |
| 4,808,995 A | 2/1989 | Clark et al. | |
| 4,911,327 A | 3/1990 | Shepherd et al. | |
| 5,258,899 A * | 11/1993 | Chen | 362/394 |
| 5,489,827 A * | 2/1996 | Xia | 315/294 |
| 5,589,747 A * | 12/1996 | Utke | 318/468 |
| 5,635,899 A | 6/1997 | Carlo et al. | |
| 5,844,415 A | 12/1998 | Gershenfeld et al. | |
| 6,038,786 A | 3/2000 | Aisenberg et al. | |
| 6,107,930 A | 8/2000 | Behlke et al. | |
| 6,737,968 B1 | 5/2004 | Ergun et al. | |
| 6,767,968 B1 | 7/2004 | Liu et al. | |

(Continued)

FOREIGN PATENT DOCUMENTS

GB       2432913       6/2007

(Continued)

OTHER PUBLICATIONS

Passive Infrared Sensor; http://en.wikipedia.org/wiki/Passive_infrared_sensors; May 27, 2008.
British Search Report Under Section 17; GB 0705891.0 which issued on Aug. 23, 2007.

(Continued)

*Primary Examiner* — Benjamin C Lee
*Assistant Examiner* — Sigmund Tang
(74) *Attorney, Agent, or Firm* — Fitch Even Tabin & Flannery LLP

(57) ABSTRACT

Upon detecting (101) (via an animate object detector (506)) an animate object, these teachings provide for automatically and responsively transmitting (102) a remote light control signal and also selectively controlling (103) local lighting (505). This can comprise temporarily switching the local lighting to a higher power mode of operation (such as a fully-on mode of operation) from a lower power mode of operation (such as a fully-off mode of operation). These teachings will further accommodate determining (301) a relatively closeness of the animate object to the remote control. When the detected animate object is more than predetermined distance from the remote control, the local lighting can remain in the lower power mode of operation. When the detected animate object, however, is within that predetermined distance from the remote control, then the aforementioned step of switching the local lighting to the higher power mode of operation can be undertaken as described.

17 Claims, 3 Drawing Sheets

U.S. PATENT DOCUMENTS

| | | |
|---|---|---|
| 6,980,095 B2 | 12/2005 | Wright et al. |
| 7,154,570 B2 * | 12/2006 | Lee .................................. 349/58 |
| 7,161,319 B2 * | 1/2007 | Ergun et al. .................... 318/445 |
| 7,221,271 B2 * | 5/2007 | Reime ............................ 340/541 |
| 7,265,670 B2 * | 9/2007 | Pantus et al. ................... 340/541 |
| 7,268,682 B2 * | 9/2007 | Bialecki et al. ................ 340/565 |
| 7,317,388 B2 * | 1/2008 | Kawabe et al. ........... 340/539.13 |
| 2002/0137479 A1 | 9/2002 | Tsui |
| 2005/0168372 A1 | 8/2005 | Hollemans |
| 2005/0176400 A1 | 8/2005 | Mullet et al. |
| 2005/0282588 A1 | 12/2005 | Linjama et al. |
| 2007/0236360 A1 | 10/2007 | Fitzgibbon |

FOREIGN PATENT DOCUMENTS

| | | | |
|---|---|---|---|
| JP | 11225059 | | 8/1999 |
| WO | WO 0113209 | | 2/2001 |
| WO | WO 2004/039631 | | 5/2004 |
| WO | WO 2006/056814 | * | 1/2006 |

OTHER PUBLICATIONS

British Examination Report Under Section 18(3); GB 0705891.0 which issued on Apr. 12, 2010.

Chaimberlain LiftMaster Model 373P 315MHz Security+ 3-Button Remote Control with Proximity Lighting Feature Owners Manual; available at least as early as 2008.

* cited by examiner

METHOD AND APPARATUS TO FACILITATE AUTOMATED CONTROL OF LOCAL LIGHTING AT A REMOTE CONTROL

TECHNICAL FIELD

This invention relates generally to remote controls and more particularly to remote controls having an end user interface with local lighting.

BACKGROUND

Remote controls of various kinds are known in the art. Generally speaking, a remote control offers a user interface that is located remotely from a controlled apparatus to thereby permit an end user to control that controlled apparatus notwithstanding a lack of proximity between the end user and the controlled apparatus. One ubiquitous example in this regard is the wall-mounted remote control typically provided with a movable barrier operator such as a garage door operator. Such a wall-mounted remote control often permits an end user to control the state of a movable barrier and/or a workspace light via the garage door operator.

In some cases, this user interface has corresponding local lighting. As used herein, this reference to "local lighting" will be understood to refer to lighting having a primary purpose of illuminating one or more features of the user interface. Such features can comprise, for example, things that the end user can touch or otherwise manipulate (such as a pushbutton or keypad) or things that the end user can perceive in order to obtain information (such as a liquid crystal display). For example, keypad backlighting comprises one salient example of local lighting. "Local lighting" will therefore be understood to not include lighting where such user interface illumination comprises only a secondary or ancillary effect (as might occur, for example, by illuminating a work light in the general vicinity of the user interface).

Such local lighting can serve both an aesthetic purpose as well as a security/convenience purpose. Such illumination can serve, for example, to assist the end user with both locating the user interface and properly manipulating the user interface's features in order to effect a particular desired control of the controlled apparatus. When provided, however, such local lighting is often "always on." This can result in wasting electricity by providing such illumination at times when ambient lighting is sufficient to serve the purposes of the local lighting.

BRIEF DESCRIPTION OF THE DRAWINGS

The above needs are at least partially met through provision of the method and apparatus to facilitate automated control of local lighting at a remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these teachings are applicable for use with a remote control having an animate object detector and a local lighting capability. Upon detecting (via the animate object detector) an animate object, these teachings can then provide for automatically and responsively transmitting a remote light control signal (for example, to a corresponding controlled apparatus) and also selectively controlling the local lighting. By one approach, for example, this latter action can comprise temporarily switching the local lighting to a higher power mode of operation (such as a fully-on mode of operation) from a lower power mode of operation (such as a fully-off mode of operation).

By one approach, these teachings will further accommodate determining a relatively closeness of the animate object to the remote control. When the detected animate object is more than predetermined distance from the remote control, the local lighting can remain in the lower power mode of operation. When the detected animate object, however, is within that predetermined distance from the remote control, then the aforementioned step of switching the local lighting to the higher power mode of operation can be undertaken as described.

So configured, the salient benefits of local lighting can be provided at times when such benefits are likely to be of some genuine use; i.e., when a person is present. This, in turn, can permit the local lighting to operate at a reduced power level (including being completely switched off) the vast majority of the time when no one is present. Those skilled in the art will recognize and appreciate that these teachings can be readily applied in combination with a wide variety of presently available animate object detectors, remote controls, and local lighting options.

Figure 1:
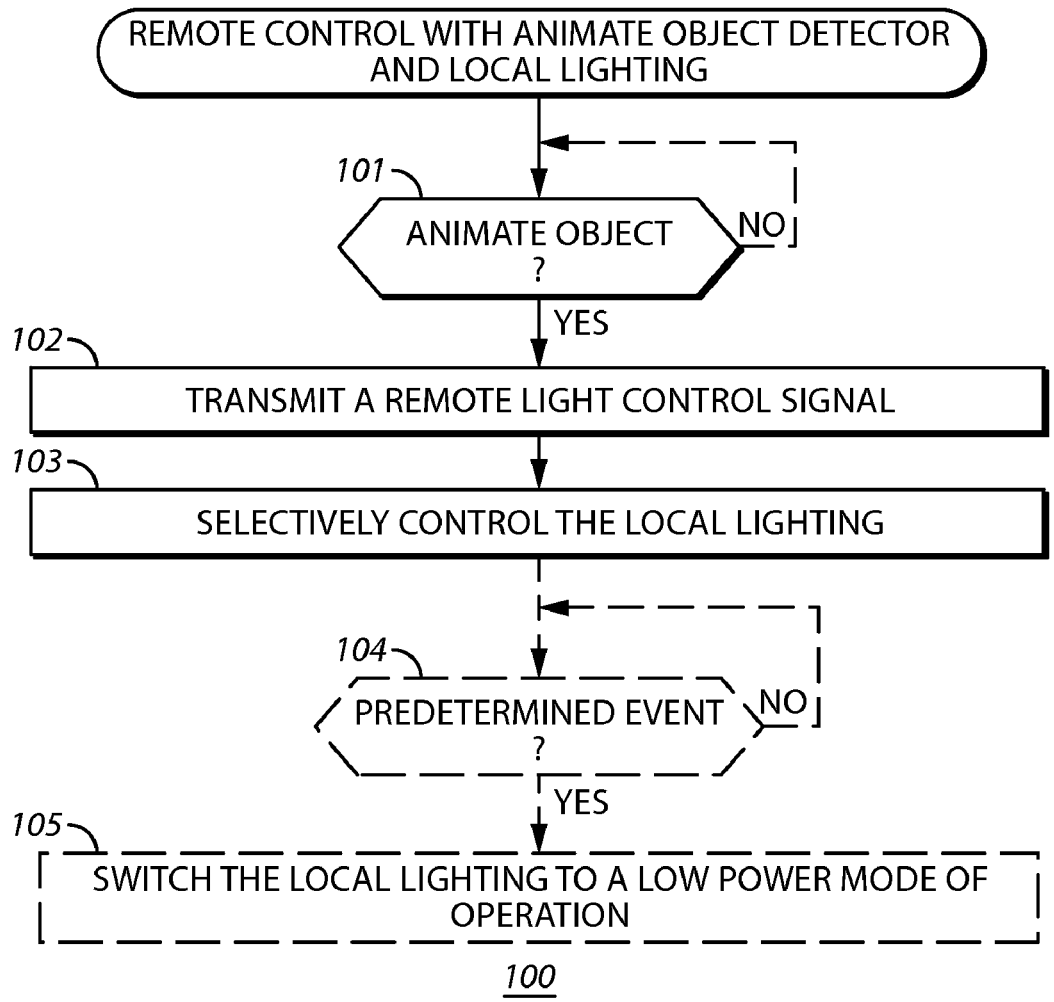
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process that is compatible with many of these teachings will now be presented.

As suggested above, this process 100 can be applied in conjunction with a remote control having an animate object detector as well as local lighting. For the purposes of this exemplary explanation, it will be presumed that this remote control comprises a remote control for a movable barrier operator. It will be understood, however, that these teachings will readily accommodate remote controls for other controlled apparatuses as well.

There are various animate object detectors known in the art. These teachings will readily accommodate, for example, animate object detectors such as image-based detectors, sound-based detectors (such as ultra sonic reflection-based detectors), active light-based detectors (such as laser reflection-based detectors), and so forth. For many application purposes, a passive infrared (PIR)-based detector will serve well in these regards. Similarly, there are numerous available options for the local lighting including but not limited to keyboard and display backlighting as well as properly directed light sources of various kinds. As these teachings are not overly sensitive to any particular selections in these regards, for the sake of brevity and the preservation of clarity, further elaboration in these regards will not be presented here except where relevant to a specific illustrative example.

This process 100 provides for detecting 101 (via the animate object detector) an animate object. This will be understood to refer to an object that is, in fact, presently "animate" and not merely to an object that can become animate. As illustrated, this process 100 will accommodate continually looping through this step until such an event occurs, if desired. Those skilled in the art will understood, however, that other possibilities exist in this regard. It would be possible, for example, to only effect this step every so often (such as once per second, twice per second, and so forth) while effecting other steps, actions, or functionality of choice between such steps. As another alternative in this regard, the detection can be interrupt based, thereby removing the burden on the enabling controller of polling the detection input.

Figure 2:
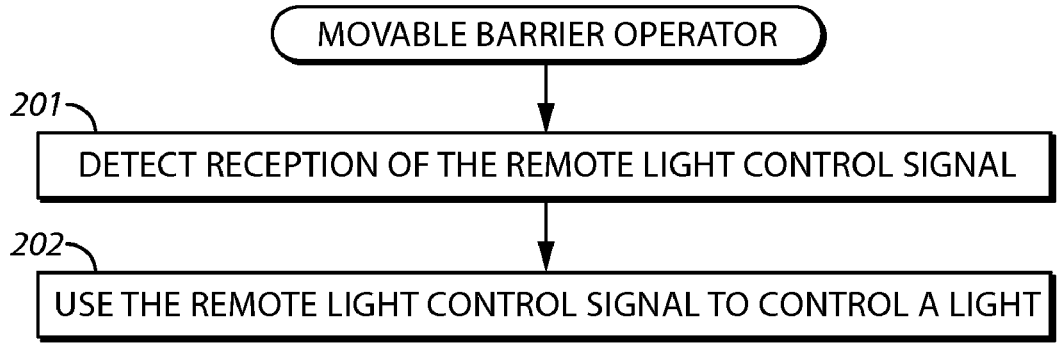
FIG. 2 comprises a flow diagram as configured in accordance with various embodiments of the invention.

Upon detecting an animate object, this process 100 then provides for transmitting 102 a remote light control signal. This can comprise making a wired (via, for example, an electrically conductive or an optically transmissive conduit) and/or a wireless transmission as appropriate to the application setting. This transmission is directed to the controlled apparatus which corresponds to the remote control itself. For example, and referring momentarily to FIG. 2, when the controlled apparatus comprises a movable barrier operator, this movable barrier operator can effect a process 200 whereby the latter detects 201 reception of this remote light control signal and responsively uses 202 the remote light control signal to control a corresponding light.

This light might comprise, for example a workspace light that comprises an integral part of the movable barrier operator itself. Those skilled in the art will understand that such an action can take into account other factors as desired (such as, for example, whether the movable barrier operator is presently active with respect to moving the movable barrier). These other factors can serve to determine whether the remote light control signal is to be observed or not, and if so, whether any other conditions are to be applied (such as a modified duration of time during which the workspace light is to be illuminated).

Referring again to FIG. 1, this process 100 also provides for responsively and selectively controlling 103 the aforementioned local lighting. This can comprise, for example, automatically causing the local lighting to now operate using a high power mode of operation (for example, by being switched on or by being switched from a dim illumination state to a bright illumination state).

Such a process 100 can therefore serve, by way of example and not by way of limitation, to cause a keypad user interface for the remote control to become backlit when a person comes within range of the remote control's animate object detector. This, in turn, can greatly facilitate the ability of the end user to locate and properly use the user interface while avoiding the unnecessary consumption of electricity that would be associated with maintaining the local lighting in an always-on mode of operation.

Figure 3:
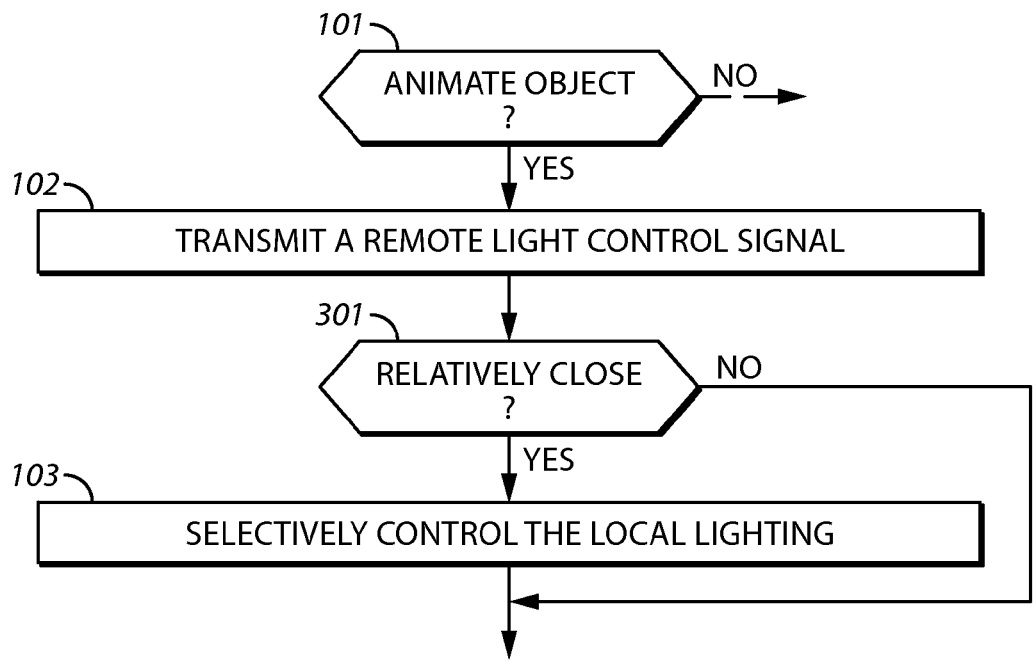
FIG. 3 comprises a flow diagram as configured in accordance with various embodiments of the invention.

If desired, this selective energization of the local lighting in response to detection of an animate object can be further conditioned upon the relative proximity of that animate object to the remote control. To illustrate by way of example (but not by way of limitation), and referring now momentarily to FIG. 3, the remote light control signal can be transmitted 102 as described above upon detecting 101 an animate object, and a next determination 301 can consider whether the detected animate object is relatively close to the animate object detector. When true, the local lighting can be selectively controlled 103 as before. When false, however, the described energization of the local lighting can be skipped.

So configured, and while the remote light control signal can be transmitted whenever the animate object detector detects an animate object, such a process will cause the local lighting to be brighter only when the animate object is relatively close to the remote control and to not effect such increased illumination when the animate object is relatively far from the remote control.

Figure 4:
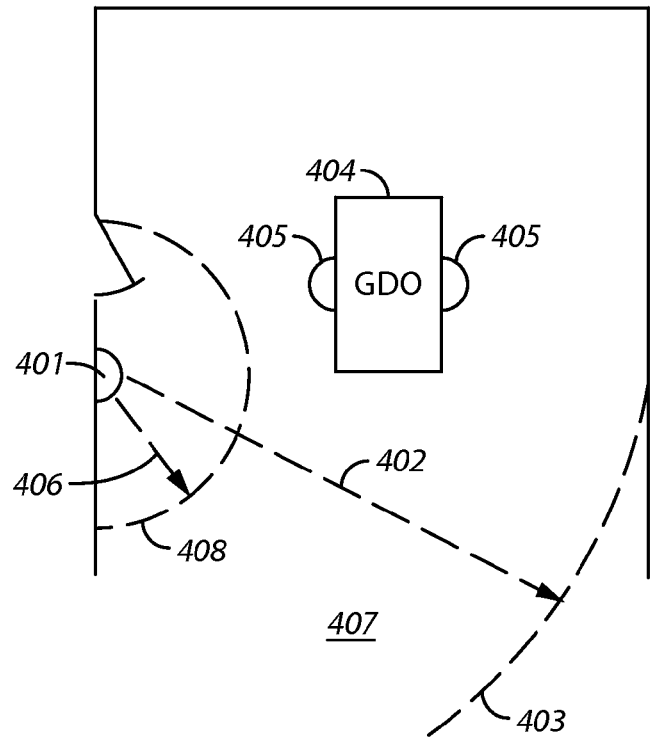
FIG. 4 comprises a top plan schematic view as configured in accordance with various embodiments of the invention.

There are various ways by which this informed functionality can be accomplished. For example, and referring now momentarily to FIG. 4, the animate object detector in the remote control 401 (in this case, a wall-mounted remote control disposed on the wall of a residential garage) has an effective detection range 402 having an outer periphery as denoted by reference numeral 403. An animate object moving anywhere within this periphery 403 will therefore be detected by the animate object detector (presuming, of course, that no obstructions prevent such detection). This level of detection can serve, in turn, as a basis for transmitting the aforementioned remote light control signal to, for example, a corresponding garage door operator (GDO) 404 that is mounted on the ceiling of the garage to thereby cause the GDO's integral workspace lights 405 to be automatically illuminated.

Mere detection of an animate object somewhere within this range 402, however, may not necessarily be a salient indication that increasing local lighting at the remote control 401 will comprise a useful activity. When the animate object comprises a person located on the other side of the garage from the remote control 401, in some cases such local lighting may serve no useful purpose whatsoever.

The animate object detector will typically provide a stronger detection signal as a function of the proximity of the detected animate object. Or, as another approach, two or more detectors can be employed to roughly (or exactly) triangulate or otherwise determine the location of the detected animate object. This being so, these processes can make use of one or more comparative threshold values to require that the animate object be relatively close to the remote control 401 and not merely within the minimal periphery 403 of the animate object detector's detection sensitivity. To illustrate by way of example, and with continued reference to FIG. 4, selective control of the local lighting as described herein can be withheld unless and until the animate object detector indicates that the animate object is within a relatively closer range 406 to the remote control 401.

By this approach, for example, a person entering the garage from the front 407 of the garage will cause the GDO's workspace lights 405 to become automatically illuminated. This act of merely entering the garage, however, will not yet cause the local lighting for the remote control 401 to increase in illumination. As this person walks towards the remote control 401, however, and crosses the boundary 408 defined by the described range 406 of required proximity, the remote control

401 will now cause the local lighting to be selectively controlled as described herein. This, in turn, will facilitate this person's successfully interfacing with the remote control 401 while also continuing to generally save electricity by avoiding unnecessarily causing such increased illumination under circumstances where such illumination may be less useful.

Those skilled in the art will recognize that other variations on this approach are possible. For example, another intermediary range of sensed proximity could be employed to facilitate further gradations in such control. By one approach, for example, distant sensing of an animate object would not cause the local lighting to become illuminated. Detection of closer proximity (for example, within three meters) could serve to cause the local lighting to be illuminated at half power. This could serve, for example, to help the person navigate to the remote control. Detection of even closer proximity (for example, within 0.5 meters) could then serve to cause the local lighting to be illuminated at full power. This could serve, for example, to help the person read the keypad and make proper selections while manipulating the keypad.

So configured, these teachings will facilitate and accommodate determining when an animate object is within a first distance of the remote control and when the animate object is within a second distance of the remote control, wherein the second distance is shorter than the first distance. The remote control can automatically transmit the remote light control signal in either case, but can be configured and arranged as described to selectively control the local lighting by increasing the illumination level for the local lighting only when the animate object is within the second distance of the remote control and not merely within the first distance of the remote control.

Referring again to FIG. 1, this process 100 will also optionally provide for determining 104 when a predetermined event occurs and then responsively and automatically switching 105 the local lighting back to a low power mode of operation. This can comprise, for example, switching the local lighting off. This predetermined event can vary with the needs and or opportunities as tend to characterize a given application setting. By one approach, for example, this predetermined event can comprise completion of a predetermined amount of time (such as, for example, thirty seconds, one minute, five minutes, and so forth). By another approach, and again by way of example, this predetermined event can comprise completion of a predetermined count (such as a count of clock cycles as may correspond to an available circuit in the remote control). By this approach, the automated selective control of the local lighting can be automatically released upon the detection of the predetermined event of choice.

Figure 5:
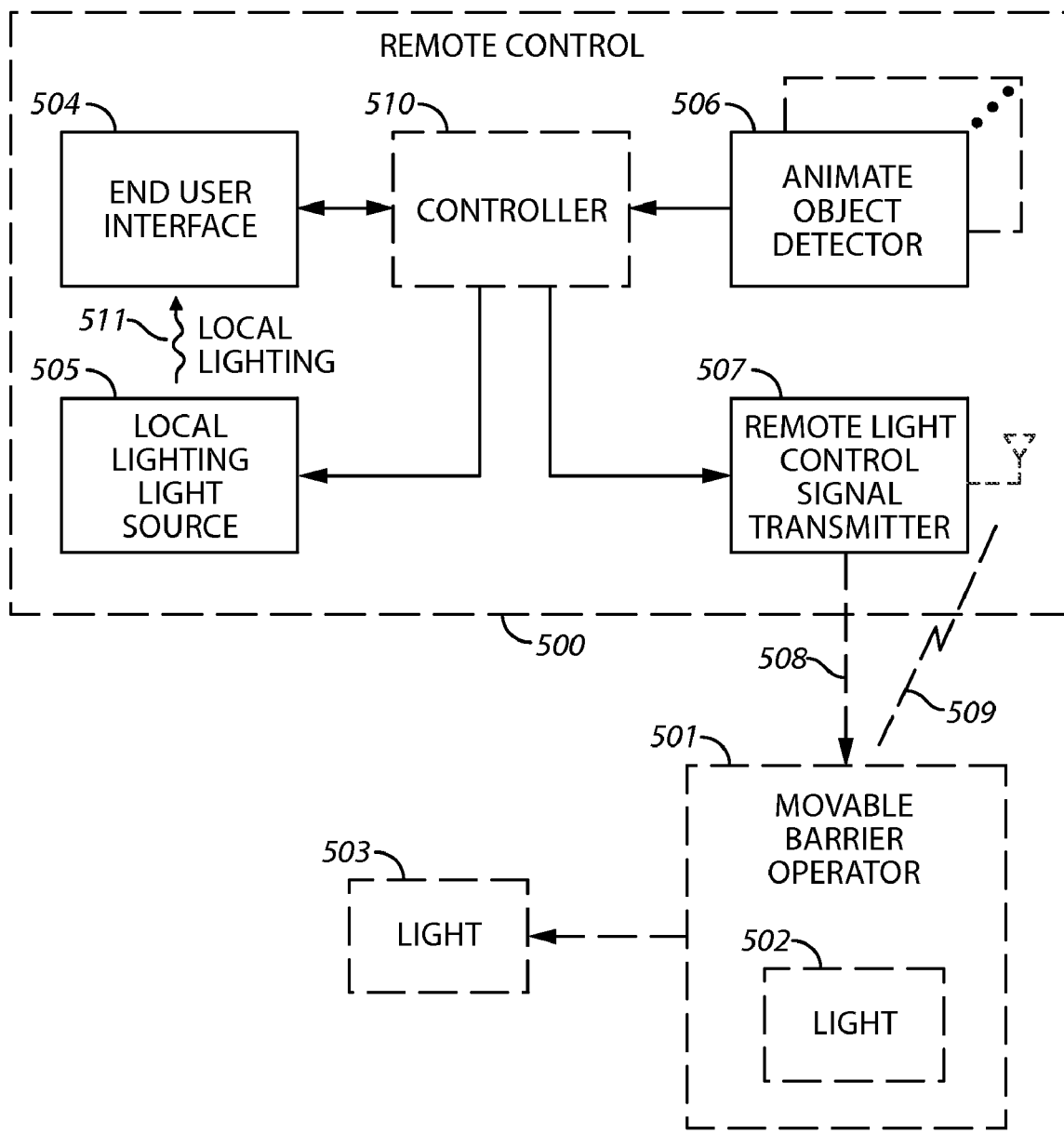
FIG. 5 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided.

This illustrative example depicts a remote control 500 that provides remote control signals/instructions to a corresponding movable barrier operator 501. This includes the aforementioned remote light control signals which the movable barrier operator 501 can employ to trigger the illumination of an integral light 502 (such as a workspace light) or an outboard light 503 (such as a ceiling mounted workspace light).

This remote control 500 generally comprises an end user interface 504 (such as, for example, a keypad, a pushbutton (or plurality of pushbuttons), a touch screen display, a liquid crystal display, and so forth), a local lighting light source 505 (or sources) as described herein, one or more animate object detectors 506 (also as described herein), and a remote light control signal transmitter 507 that is configured and arranged to provide the aforementioned remote light control signal via a wired connection 508 and/or a wireless connection 509 as desired. Numerous such transmitters are well known in the art and require no further description here.

By one approach, these various components of the remote control 500 can operably couple to a controller 510. Those skilled in the art will recognize and appreciate that such a controller 510 can comprise a fixed-purpose hard-wired platform or can comprise a partially or wholly programmable platform such as a microprocessor/microcontroller of choice. All of these architectural options are well known and understood in the art and require no further description here.

This controller 510 can be configured and arranged (via, for example, appropriate programming as will be well understood by those skilled in the art) to carry out one or more of the steps, actions, and functionality described herein. This can comprise, for example, programming the controller 510 to respond to detection of an animate object via the animate object detector(s) 506 by causing the remote light control signal transmitter 507 to transmit a remote light control signal to the movable barrier operator 501 while also effecting the described selective control of the local lighting light source 505 to provide local lighting 511 with respect to the end user interface 504.

Those skilled in the art will recognize and understand that such a remote control 500 may be comprised of a plurality of physically distinct elements as is suggested by the illustration shown in FIG. 5. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured and arranged, it will be understood and appreciated that these teachings facilitate a useful compromise between energy conservation on the one hand and convenience and security on the other hand by providing local lighting for the remote control's end user interface when more likely to be accessed by an end user.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    at a remote control having a user interface, an animate object detector for detecting animate objects at a plurality of ranges, and local lighting, wherein the local lighting comprises lighting having a primary purpose of illuminating one or more features of the user interface and not lighting where the user interface illumination is only a secondary or ancillary effect:
    detecting, via the animate object detector, an animate object within an outer periphery having an outer range;
    in response to detecting the animate object within the outer periphery, transmitting a remote light control signal to a moveable barrier operator, which in response effects illumination of a light at the moveable barrier operator;

detecting, via the animate object detector, the animate object within an inner periphery having an inner range that is smaller than the outer range;

in response to detecting the animate object within the inner periphery, selectively illuminating the local lighting at least one of the one or more features of the remote control.

2. The method of claim 1 wherein the remote control comprises a remote control for the movable barrier operator.

3. The method of claim 2 wherein transmitting a remote light control signal to a moveable barrier operator comprises transmitting a remote light control signal to a moveable barrier operator having an integral light, which in response effects illumination of the integral light.

4. The method of claim 1 wherein the animate object detector comprises at least one of:
   an image-based detector;
   a sound-based detector;
   an active light-based detector.

5. The method of claim 1 wherein the animate object detector comprises a passive infrared (PIR)-based detector.

6. The method of claim 1 wherein the detecting the animate object within an outer periphery and detecting the animate object within an inner periphery comprises using at least a distant proximity threshold and a close proximity threshold, respectively.

7. The method of claim 1 wherein selectively illuminating the local lighting comprises causing the local lighting to be brighter when the animate object is within the inner periphery than when the animate object is outside the inner periphery.

8. The method of claim 7 wherein causing the local lighting to be brighter when the animate object is within the inner periphery than when the animate object is outside the inner periphery comprises causing the local lighting to be on when the animate object is within the inner periphery and off when the animate object is outside the inner periphery.

9. The method of claim 1 wherein selectively illuminating the local lighting further comprises:
   operating the local lighting using a high power mode of operation;
   automatically switching the local lighting to a low power mode of operation in response to a predetermined event.

10. The method of claim 9 wherein the predetermined event comprises completion of a predetermined amount of time.

11. The method of claim 9 wherein the predetermined event comprises completion of a predetermined count.

12. The method of claim 1 wherein the transmitting the remote light control signal to a moveable barrier operator, which in response effects illumination of a light comprises transmitting a remote light control signal to a moveable barrier operator, which in response effects illumination of a workspace light.

13. The method of claim 1 wherein the transmitting the remote light control signal to a moveable barrier operator, which in response effects illumination of a light comprises determining whether to transmit a remote light control signal to a moveable barrier operator, which in response effects illumination of a workspace light as a further function, at least in part, of whether the movable barrier operator is presently active with respect to moving a movable barrier.

14. A remote control comprising:
   an end user interface;
   a remote light control signal transmitter operably coupled to the end user interface;
   an animate object detector operably coupled to the remote light control signal transmitter;
   a local lighting light source operably coupled to the animate object detector, wherein the local lighting source comprises lighting having a primary purpose of illuminating one or more features of the user interface and not lighting where the user interface illumination is only a secondary or ancillary effect;
   wherein the remote control is configured and arranged to, in response to detecting, via the animate object detector, an animate object:
      in response to detecting the animate object within a first distance from the animate object detector, cause the remote light control signal transmitter to transmit a remote light control signal to a moveable barrier operator having a light, which in response illuminates the light;
      in response to detecting the animate object within a second distance from the animate object detector that is shorter than the first distance, selectively illuminate the local lighting light source at least one of the one or more features of the end user interface.

15. The remote control of claim 14 wherein the remote control comprises a remote control for the movable barrier operator.

16. The remote control of claim 14 wherein the animate object detector comprises at least one of:
   an image-based detector;
   a sound-based detector;
   an active light-based detector.

17. The remote control of claim 14 wherein the animate object detector comprises a passive infrared (PIR)-based detector.

* * * * *